(12) United States Patent
Yamaguchi

(10) Patent No.: US 9,418,248 B2
(45) Date of Patent: Aug. 16, 2016

(54) IMAGE FORMING APPARATUS, IMAGE FORMING SYSTEM, AND METHOD

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 146 days.

(21) Appl. No.: 14/554,436

(22) Filed: Nov. 26, 2014

(65) Prior Publication Data

US 2015/0150096 A1    May 28, 2015

(30) Foreign Application Priority Data

Nov. 28, 2013    (JP) ................................. 2013-245758

(51) Int. Cl.

| | | |
|---|---|---|
| *H04L 12/24* | (2006.01) | |
| *G06F 21/64* | (2013.01) | |
| *G06F 21/85* | (2013.01) | |
| *G06F 21/82* | (2013.01) | |
| *G06F 21/34* | (2013.01) | |
| *G06F 21/60* | (2013.01) | |

(52) U.S. Cl.
CPC ................ *G06F 21/82* (2013.01); *G06F 21/34* (2013.01); *G06F 21/608* (2013.01); *G06F 2221/2101* (2013.01)

(58) Field of Classification Search
CPC ....... H04L 9/3234; H04L 12/24; H04L 63/20; H04L 63/0281; G06F 3/1284; G06F 11/0748; G06F 11/0787; G06F 11/3476; G06F 21/64; G06F 21/85; G06F 2221/2129

USPC ...................... 726/2, 6, 16–21, 26, 27, 29, 31
See application file for complete search history.

(56) References Cited

U.S. PATENT DOCUMENTS

| | | |
|---|---|---|
| 8,005,994 B2 | 8/2011 | Takara |
| 8,041,101 B2 | 10/2011 | Okamoto et al. |
| 2006/0001904 A1 | 1/2006 | Takara |
| 2009/0099889 A1 | 4/2009 | Okamoto et al. |
| 2009/0225368 A1 | 9/2009 | Takara |

(Continued)

FOREIGN PATENT DOCUMENTS

| | | |
|---|---|---|
| JP | 2006-018660 A | 1/2006 |
| JP | 2008-158862 A | 7/2008 |

(Continued)

OTHER PUBLICATIONS

An Office Action; "Notice of Reasons for Rejection," issued by the Japanese Patent Office on Mar. 15, 2016, which corresponds to Japanese Patent Application No. 2013-245758 and is related to U.S. Appl. No. 14/554,436.

*Primary Examiner* — Joseph P Hirl
*Assistant Examiner* — Kalish Bell
(74) *Attorney, Agent, or Firm* — Studebaker & Brackett PC

(57) ABSTRACT

An image forming apparatus is connectable to an external storage device and includes an authentication data generating section and a writing section. Upon occurrence of a prescribed event, the authentication data generating section generates authentication data and transmits the generated authentication data to a server. Once the external storage device is connected, the writing section obtains first data relating the event according to whether or not the authentication data transmitted to the server is stored in the external storage device and writes the obtained first data into the external storage device.

13 Claims, 3 Drawing Sheets

(56) References Cited

U.S. PATENT DOCUMENTS

2015/0143506 A1* 5/2015 Sugano .................. G06F 21/85
726/17

FOREIGN PATENT DOCUMENTS

| JP | 2008158862 A | * | 7/2008 |
| JP | 2009-100179 A | | 5/2009 |

* cited by examiner

IMAGE FORMING APPARATUS, IMAGE FORMING SYSTEM, AND METHOD

INCORPORATION BY REFERENCE

The present application claims priority under 35 U.S.C. §119 to Japanese Patent Application No. 2013-245758, filed Nov. 28, 2013. The contents of this application are incorporated herein by reference in their entirety.

BACKGROUND

The present disclosure relates to image forming apparatuses, image forming systems, and methods.

Traditional image forming apparatuses have been known that collect necessary information in their own when an external storage device is connected thereto and write the collected information into the connected external storage device. When it is detected that the external storage device is connected, such an image forming apparatus obtains prescribed PIN information and specification information for specifying to-be-output information from the external storage device and determines whether or not the obtained PIN information agrees with authentication information stored in advance. When determination results in agreement, the image forming apparatus outputs information specified by the specification information to the external storage device.

SUMMARY

An image forming apparatus according to one aspect of the present disclosure is connectable to an external storage device and includes an authentication data generating section and a writing section. The authentication data generating section is configured to generate authentication data upon occurrence of a prescribed event and to transmit the generated authentication data to a server via a communication network. The writing section is configured to obtain, once the external storage device is connected to the image forming apparatus, first data as data relating to the event according to whether or not the authentication data transmitted to the server is stored in the external storage device and to write the obtained first data into the external storage device.

An image forming system according to another aspect of the present disclosure includes an image forming apparatus connectable to an external storage device, and a server connected to the image forming apparatus via a communication network. The image forming apparatus includes an authentication data generating section and a writing section. The authentication data generating section is configured to generate authentication data upon occurrence of a prescribed event and to transmit the generated authentication data to the server via the communication network. The writing section is configured to obtain, once the external storage device is connected to the image forming apparatus, first data as data relating to the event according to whether or not the authentication data transmitted to the server is stored in the external storage device and to write the obtained first data into the external storage device.

A method according to still another aspect of the present disclosure is a method that an image forming apparatus connectable to an external storage device performs. The method includes a first step and a second step. The first step is a step of generating authentication data upon occurrence of a prescribed event and transmitting the generated authentication data to a server via a communication network. The second step is a step of obtaining, once the external storage device is connected to the image forming apparatus, first data as data relating to the event according to whether or not the authentication data transmitted to the server is stored in the external storage device and writing the obtained first data into the external storage device.

DETAILED DESCRIPTION

Embodiments of the present disclosure will be described below with reference to the accompanying drawings. Note that the following embodiments are not intended to limit the scope of the appended claims. Not all elements and combinations of them described in the following embodiments are necessarily essential to measures for achieving the present disclosure. In the accompanying drawings, the same reference sings are assigned to the same elements.

Figure 1:
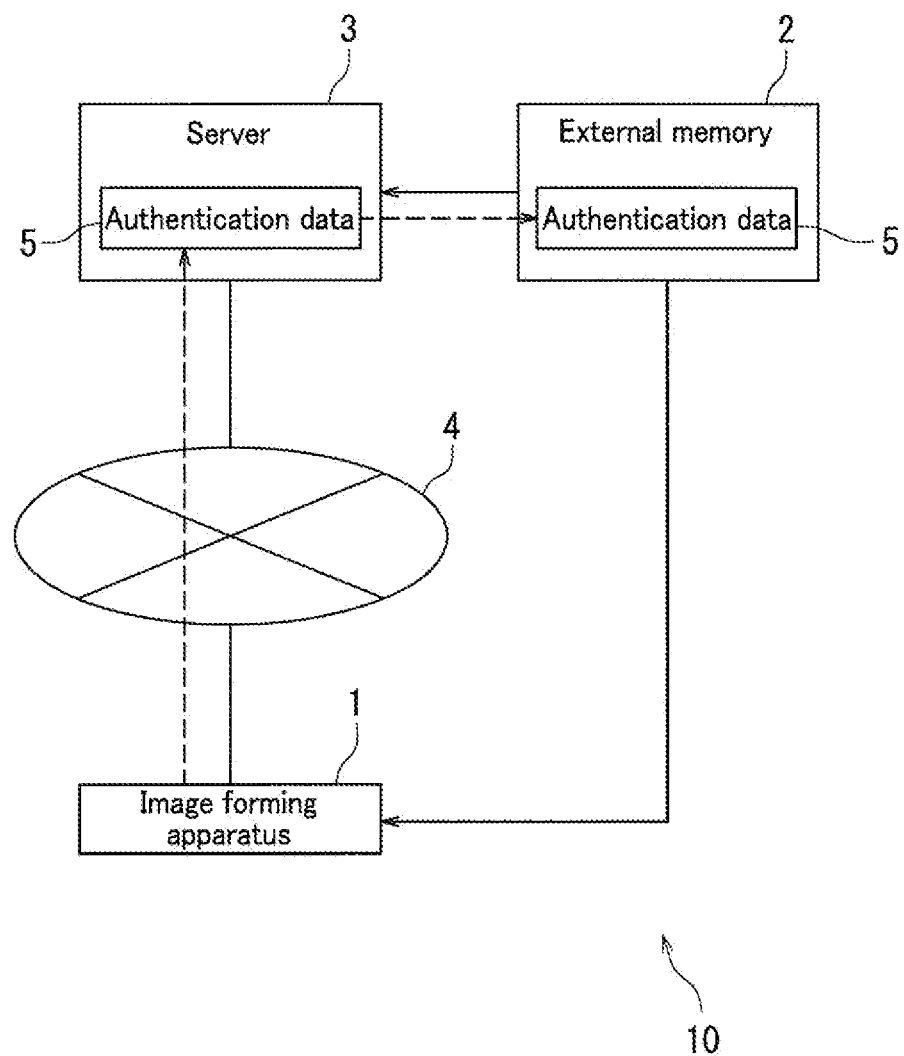
FIG. 1 is an illustration showing an example configuration of an image forming system according to an embodiment.

FIG. 1 is an illustration showing an example configuration of an image forming system 10 according to an embodiment.

An image forming system 10 includes an image forming apparatus 1 and a server 3. The image forming apparatus 1 and the server 3 are connected together via a communication network 4. For example, the communication network 4 may be a local area network (LAN), Internet, facsimile circuit, telephone network, or the like.

The image forming apparatus 1 may be a multifunction peripheral (MFP), for example, and has functions of a scanner, a copier, a printer, and a facsimile machine (FAX). The image forming apparatus 1 and the serer 3 each are connectable to an external memory 2 (external storage device). The external memory 2 is a removable medium and may be a universal serial bus (USB) memory or a secure digital (SD) card, for example.

Upon occurrence of a prescribed event such as malfunction, status change, etc. (malfunction in the present embodiment) in the image forming apparatus 1 according to the present embodiment, the image forming apparatus 1 generates authentication data 5 based on data relating to the occurring event. Then, the image forming apparatus 1 transmits the generated authentication data 5 to the server 3 via the communication network 4. The authentication data 5 transmitted to the server 3 is stored in the external memory 2 by, for example, a serviceman. The serviceman in the present embodiment means a person who addresses, upon occurrence of a malfunction in the image forming apparatus 1, analysis and correction of the malfunction.

Once the external memory 2 is connected to the image forming apparatus 1, the image forming apparatus 1 performs determination as to whether or not analysis data (first data) relating to the occurring malfunction is obtainable according to whether or not the authentication data 5 transmitted to the server 3 is stored in the external memory 2 (hereinafter referred to as obtainability determination). The analysis data herein means data utilized for analysis of the malfunction upon occurrence of the malfunction in the image forming apparatus 1 and is data obtained from the image forming apparatus 1. The analysis data includes, for example, log data indicative of a log of processing performed in the image forming apparatus 1, a log of a user operation, etc., data indicative of statuses of respective elements in the image forming apparatus 1, and debag data obtained during a debag operation. In general, analysis data includes confidential information that is desired not to be known to any person including a user of the image forming apparatus 1 other than the serviceman.

When it is determined that analysis data is obtainable in the obtainability determination, the image forming apparatus 1 writes the analysis data into the connected eternal memory 2. Specifically, when the authentication data 5 transmitted to the server 3 is stored in the connected external memory 2, the image forming apparatus 1 determines that analysis data is obtainable, and writes the analysis data into the external memory 2. By contrast, when the authentication data 5 transmitted to the server 3 is not stored in the connected external memory 2, the image forming apparatus 1 determines that analysis data is unobtainable, and does not perform analysis data writing on the external memory 2.

Figure 2:
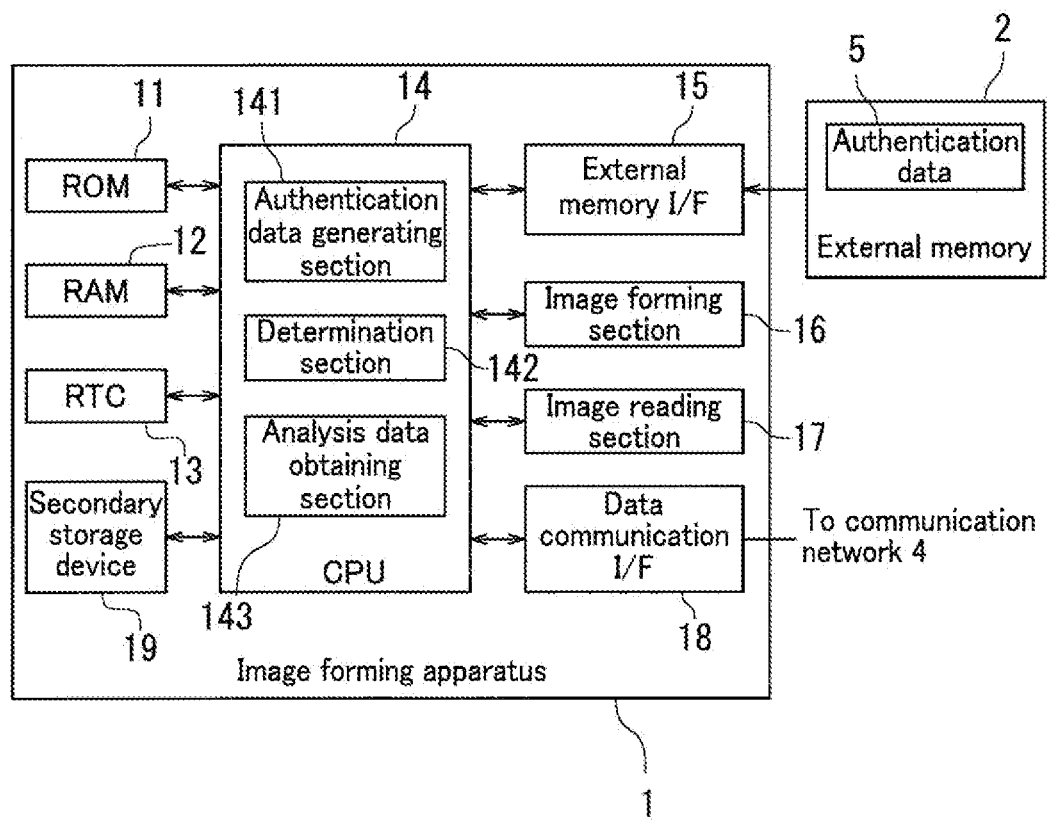
FIG. 2 is block diagram showing an example configuration of an image forming apparatus according to an embodiment.

FIG. 2 is a block diagram showing an example configuration of the image forming apparatus 1 according to an embodiment.

The image forming apparatus 1 includes a read only memory (ROM) 11, a random access memory (RAM) 12, a real time clock (RTC) 13, a central processing unit (CPU) 14, an external memory interface (I/F) 15, an image forming section 16, an image reading section 17, a data communication I/F 18, and a secondary storage device 19. The ROM 11, the RAM 12, the RTC 13, the external memory I/F 15, the image forming section 16, the image reading section 17, the data communication I/F 18, and the secondary storage device 19 are connected to the CPU 14.

The CPU 14 controls the operation that image forming apparatus 1 performs. The CPU 14 in the present embodiment performs analysis data obtaining processing as follows. That is, upon occurrence of a malfunction in the image forming apparatus 1, the CPU 14 generates authentication data 5 and transmits the generated authentication data 5 to the server 3. Once the external memory 2 is connected to the image forming apparatus 1, the CPU 14 performs the obtainability determination. When the determination results in that analysis data is obtainable, the CPU 14 writes the analysis data into the connected external memory 2. The analysis data obtaining processing will be described later in detail with reference to FIG. 3.

The CPU 14 includes a authentication data generating section 141, a determination section 142, and an analysis data obtaining section 143. The authentication data generating section 141 generates, upon occurrence of a malfunction in the image forming apparatus 1, authentication data 5 and transmits the generated authentication data 5 to the server 3. Once the external memory 2 is connected to the image forming apparatus 1, the determination section 142 performs the obtainability determination. When the obtainability determination results in that analysis data is obtainable, the analysis data obtaining section 143 collects the analysis data in the image forming apparatus 1 and writes the collected analysis data into the external memory 2.

The functions of the CPU 14 including each function of the authentication data generating section 141, the determination section 142, and the analysis data obtaining section 143 are performed in a manner that the CPU 14 executes various computer programs loaded on the RAM 12 from the ROM 11. Rather than execution of each function of the authentication data generating section 141, the determination section 142, and the analysis data obtaining section 143 through software, hardware that performs the respective functions may be mounted on the image forming apparatus 1.

The ROM 11 may be a programmable ROM (PROM) such as a flash memory. The RAM 12 may be a dynamic RAM (DRAM), for example. The ROM 11 stores, for example, various types of computer programs such as firmware executed by the CPU 14. The CPU 14 loads a target computer program from the ROM 11 to the RAM 12 and executes the loaded program.

The RTC 13 manages the current date and time. The image forming section 16 performs a printing function. The image reading section 17 performs a scanning function. The external memory I/F 15 is an interface for connection to the external memory 2. The data communication I/F 18 is an interface for connection to the communication network 4. The secondary storage device 19 is a non-volatile storage device such as a hard disc drive or a flash memory.

The processing that the image forming apparatus 1 according to the present embodiment preforms will be now be described next.

Figure 3:
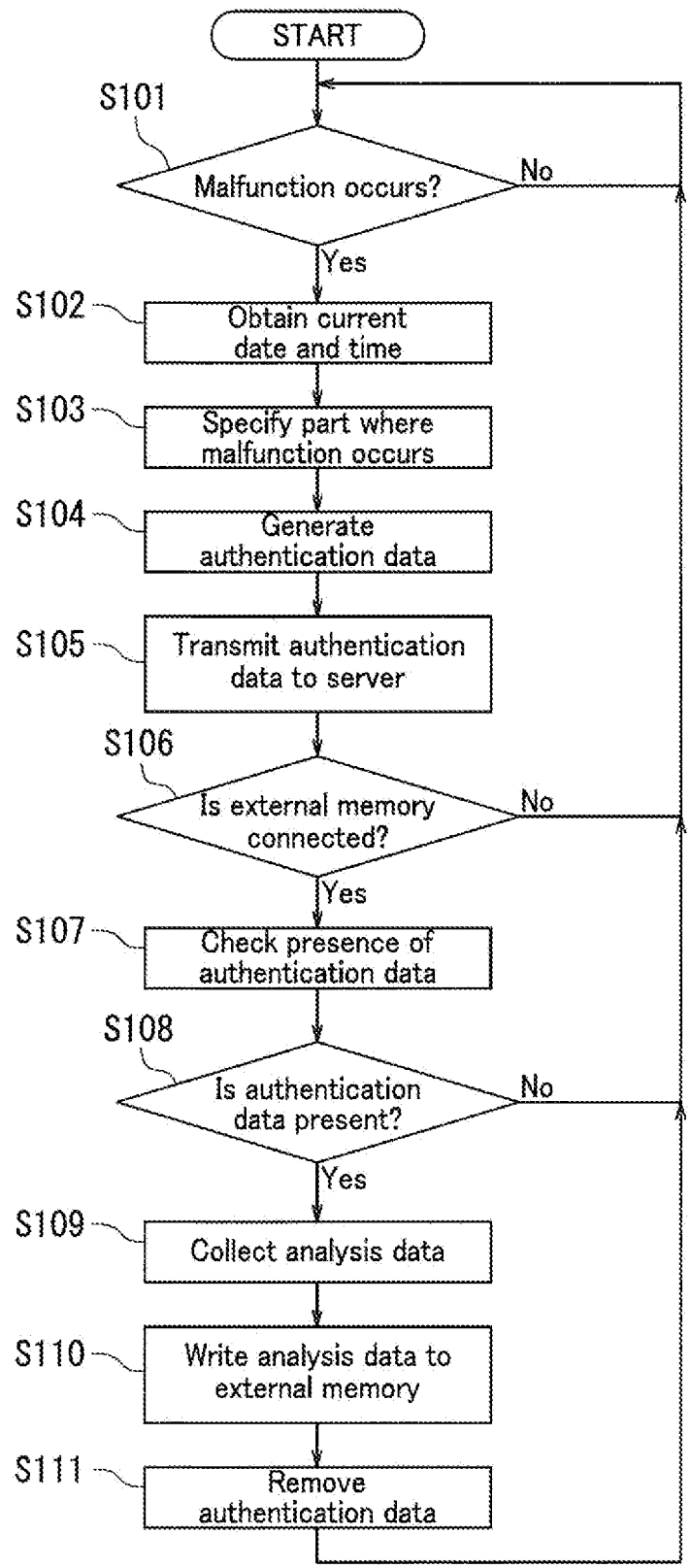
FIG. 3 is a flowchart depicting analysis data obtaining processing according to an embodiment.

FIG. 3 is a flowchart depicting the analysis data obtaining processing according to the present embodiment.

During activation of the image forming apparatus 1, the CPU 14 of the image forming apparatus 1 monitors occurrence of a malfunction in the image forming apparatus 1 (Step S101). Upon detection of occurrence of a malfunction in the image forming apparatus 1 (Yes at Step S101), the CPU 14 obtains from the RTC 13 data indicative of the current date and time, that is, the date and time when the malfunction occurs (Step S102).

Next, the CPU 14 specifies a malfunction occurring part, specifically, a part of the image forming apparatus 1 where the malfunction practically occurs (Step S103).

The authentication data generating section 141 of the CPU 14 generates authentication data 5 based on the data obtained at Step S102 that is indicative of the date and time when the malfunction occurs and data indicative of the part specified at Step S103 where the malfunction occurs. The authentication data generating section 141 stores the generated authentication data 5 in a storage section (the RAM 12 or the secondary storage section 19) of the image forming apparatus 1 (Step S104).

The authentication data 5 is data generated based on data relating to a malfunction occurring in the image forming apparatus 1, for example, and is generated based on data indicative of the date and time when a malfunction occurs and data indicative of a part where the malfunction occurs in the present embodiment. Other than the data indicative of the date and time when a malfunction occurs and data indicative of a part where the malfunction occurs, the data relating to a malfunction may include data that specifies the image forming apparatus 1 in which the malfunction occurs, that is, the serial number that the image forming apparatus 1 bears, for example. The authentication data generating section 141 may generate, as the authentication data 5, data including data relating to a malfunction or data obtained by performing prescribed processing on the data relating to the malfunction. Alternatively, data generated based on data other than data relating to a malfunction or data generated at random can serve as the authentication data 5.

The authentication data generating section 141 then controls the data communication I/F 18 to transmit the generated authentication data 5 to the server 3 via the communication network 4 (Step S105).

Once the external memory 2 is connected to the image forming apparatus 1 thereafter (Yes at Step S106), the determination section 142 of the CPU 14 determines whether or not the authentication data 5 transmitted to the server 3 is stored in the storage region of the connected external memory 2 (Steps S107 and S108). According to the determination result, whether or not analysis data relating to the occurring malfunction is obtainable is determined.

The determination at Step S108 is performed as follows, for example. That is, when the authentication data 5 is stored in the external memory 2, and the authentication data 5 stored in the external memory 2 agrees with the authentication data 5 stored in the storage section of the image forming apparatus 1, the determination section 142 determines that the authentication data 5 transmitted to the server 3 is stored in the storage region of the external memory 2. When it is determined that the authentication data 5 transmitted to the server 3 is stored in the storage region of the external memory 2, the determination section 142 determines that analysis data is obtainable. By contrast, when no authentication data 5 is stored in the external memory 2, or the authentication data 5 stored in the external memory 2 disagrees with the authentication data 5 stored in the storage section of the image forming apparatus 1, the determination section 142 determines that the authentication data 5 transmitted to the server 3 is not stored in the storage region of the external memory 2. When it is determined that the authentication data 5 transmitted to the server 3 is not stored in the storage region of the external memory 2, the determination section 142 determines that analysis data is unobtainable.

By contrast, when the external memory 2 is not connected to the image forming apparatus (No at step S106), the processing by the CPU 14 returns to Step S101. For example, when the external memory 2 has not been connected to the image forming apparatus 1 for a prescribed time period, (e.g., ten days) since the authentication data generating section 141 had transmitted the authentication data 5 to the server 3, the processing by the CPU 14 returns to Step S101. In so doing, the authentication data generating section 141 removes the authentication data 5 stored in the storage section of the image forming apparatus 1 at Step S104 from the storage section.

In other words, once a prescribed available time period elapses from transmission of the authentication data 5 by the authentication data generating section 141, the CPU 141 does not perform analysis data writing on the external memory 2 even when the external memory 2 is connected to the image forming apparatus 1, and the authentication data 5 transmitted to the server 3 is stored in the external memory 2. In this manner, even if a third person would steal authentication data 5 or obtain the external memory 2 storing correct authentication data 5, since the available time period for the authentication data 5 transmitted to the server 3 is set, the third person could obtain the analysis data only within the limited available time period. Thus, a risk can be reduced that analysis data goes to a third person to be read.

Note that the available time period may be set in advance prior to occurrence of a malfunction. Alternatively, the available time period may be set according to an occurring malfunction each time it occurs. For example, the image forming apparatus 1 may set, upon occurrence of a malfunction, a time period appropriate to the content of the malfunction as the available time period. Besides, data indicative of the available time period is stored in the storage section of the image forming apparatus 1, for example. The data indicative of the available time period may indicate the length of the available time period or expiration date and time of the available time period. Where the data indicative of the available time period is data indicative of the length of the available time period and indicates, for example, ten days, the available time period is ten days from transmission of the authentication data 5. Or, where the data indicative of the available time period is data indicative of expiration date and time of the available time period and indicates, for example, January 1, 0:00 pm, the available time period lasts until January 1, 0:00 pm.

When it is determined that the authentication data 5 transmitted to the server 3 is not stored in the storage region of the external memory 2, that is, that analysis data is unobtainable (No at Step S108), the processing by the CPU 14 returns to Step S101.

By contrast, when it is determined that the authentication data 5 transmitted to the server 3 is stored in the storage region of the external memory 2, that is, that analysis data is obtainable (Yes at Step S108), the analysis data obtaining section 143 of the CPU 14 collects analysis data relating to the malfunction occurring in the image forming apparatus 1 (Step S109).

Then, the analysis data obtaining section 143 controls the external memory I/F 15 to write the collected analysis data into the storage region of the external memory 2 (Step S110).

Subsequently, the authentication data generating section 141 removes the authentication data 5 stored in the storage section of the image forming apparatus 1 at Step S104 from the storage section (Step S111).

In other words, once analysis data is obtained based on authentication data 5 transmitted to the server 3, the image forming apparatus 1 is disabled from obtaining the analysis data again based on the same authentication data 5. The serviceman obtains analysis data, for example, for correction of a malfunction of the image forming apparatus 1. However, it can be considered that once he/she obtains the analysis data and recovers the image forming apparatus 1 using the obtained analysis data, the same analysis data needs not to be obtained again. When the image forming apparatus 1 is so set to be enabled to obtain analysis data only one time based on the presence of authentication data 5 transmitted to the server 3, security can be further increased in analysis data obtainment based on the presence of authentication data 5.

Thereafter, the processing by the CPU 14 returns to S101 again for monitoring of occurrence of a malfunction in the image forming apparatus 1.

Each time a malfunction occurs, the image forming apparatus 1 according to the present embodiment generates new authentication data 5 and transmits it to the server 3. When the external memory 2 storing the transmitted authentication data 5 is connected to the image forming apparatus 1, the image forming apparatus 1 writes analysis data relating to the occurring malfunction into the external memory 2. In other words, in order to obtain analysis data relating to the latest malfunction, the latest authentication data 5, that is, authentication data 5 generated when the latest malfunction occurs is necessary.

Accordingly, even if a third person would steal authentication data 5, the third person could be prevented from obtaining and reading analysis data relating to the latest malfunction as long as the stolen authentication data 5 is generated some time ago. Further, even if the stolen authentication data 5 would be the latest one, when new authentication data 5 is generated in response to occurrence of another malfunction in the image forming apparatus 1 later, the stolen authentication data 5 could be no longer the latest one. This can prevent a third person from obtaining and reading the analysis data relating to the latest malfunction. Even if the stolen authentication data 5 would be the latest one, once the available time period set in the authentication data 5 elapses, the analysis data can be prevented from being obtained and read by a third person.

As has been described above, even if a third person would steal authentication data 5 in the external memory 2, a risk could be reduced that the third person fraudulently obtains and reads corresponding analysis data. Thus, obtaining appropriate analysis data of the image forming apparatus 1 using the external memory 2 can be done more safely.

Although one embodiment has been described above, the present disclosure is not limited to the above embodiment. Various alterations can be made within the scope not departing from the subject matter of the present disclosure.

The prescribed time period starting from transmission of the authentication data 5 by the authentication data generating section 141 is set as the available time period for the authentication data 5 in the analysis data obtaining processing in the present embodiment, whereas a time period starting from transmission of the authentication data 5 by the authentication data generating section 141 to power off of the image forming apparatus 1 may be set as the available time period for the authentication data 5, for example.

Where the external memory 2 is not connected until, for example, the available time period elapses at Step S106 in FIG. 3, the image forming apparatus 1 in the present embodiment performs no analysis data writing on the external memory 2. However, the image forming apparatus 1 may perform the following processing. That is, the image forming apparatus 1 waits at Step S106 in FIG. 3 regardless of the available time period until the external memory 2 is connected thereto. Only when the external memory 2 is connected, the routine then proceeds to Step S107 and the steps thereafter in the image forming apparatus 1.

The present embodiment is applicable to, in addition to the image forming apparatus 1, various information processing devices connectable to the external memory 2.

What is claimed is:

1. An image forming apparatus connectable to an external storage device, the image forming apparatus comprising:
   a memory storing executable instructions; and
   a processor that executes the instructions to generate:
      an authentication data generating section configured to generate authentication data upon occurrence of a prescribed event and to transmit the generated authentication data to a server via a communication network; and
      a writing section configured to obtain, once the external storage device is connected to the image forming apparatus, first data as data relating to the event according to whether or not the authentication data transmitted to the server is stored in the external storage device and to write the obtained first data into the external storage device.

2. An image forming apparatus according to claim 1, further comprising:
   a determination section configured to determine whether or not the first data is obtainable according to whether or not the authentication data transmitted to the server is stored in the external storage device,
   wherein when a determination result is positive, the writing section obtains the first data.

3. An image forming apparatus according to claim 2, wherein
   when the external storage device is connected to the image forming apparatus at a time other than an available time period starting from transmission of the authentication data by the authentication data generating section until a prescribed time period elapses, the determination section determines that the first data is unobtainable even if the authentication data transmitted to the server is stored in the external storage device.

4. An image forming apparatus according to claim 3, further comprising:
   a storage section,
   wherein the authentication data generating section stores the generated authentication data in the storage section,
   when authentication data stored in the external storage device agrees with the authentication data stored in the storage section, the determination section determines that the first data is obtainable, and
   once the available time period elapses, the authentication data generating section removes the authentication data stored in the storage section from the storage section.

5. An image forming apparatus according to claim 3, wherein
   the available time period is a time period starting from transmission of the authentication data generated by the authentication data generating section to power off of the image forming apparatus.

6. An image forming apparatus according to claim 2, wherein
   once the first data has been written into the external device, the determination section determines that the first data is unobtainable even when the authentication data transmitted to the server is stored in the external storage device.

7. An image forming apparatus according to claim 6, further comprising:
   a storage section,
   wherein the authentication data generating section stores the generated authentication data in the storage section,
   when authentication data stored in the external storage device agrees with the authentication data stored in the storage section, the determination section determines that the first data is obtainable, and
   once the first data is written into the external storage device, the authentication data generating section removes the authentication data stored in the storage section from the storage section.

8. An image forming apparatus according to claim 2, further comprising:
   a storage section,
   wherein the authentication data generating section stores the generated authentication data in the storage section, and
   when authentication data stored in the external storage device agrees with the authentication data stored in the storage section, the determination section determines that the first data is obtainable.

9. An image forming apparatus according to claim 1, wherein
   the prescribed event is malfunction in the image forming apparatus,
   the first data is data utilized for analysis of a malfunction upon occurrence of the malfunction in the image forming apparatus and is analysis data obtained from the image forming apparatus,
   the first data includes log data of the image forming apparatus, and
   the authentication data generating section generates the authentication data based on any one or more of data indicative of date and time when a malfunction occurs in the image forming apparatus, data indicative of a part where a malfunction occurs in the image forming apparatus, and a serial number that the image forming apparatus bears.

10. An image forming system comprising:
an image forming apparatus connectable to an external storage device; and
a server connected to the image forming apparatus via a communication network,
wherein the image forming apparatus includes:
an authentication data generating section configured to generate authentication data upon occurrence of a prescribed event and to transmit the generated authentication data to the server via the communication network; and
a writing section configured to obtaining, once the external storage device is connected to the image forming apparatus, first data as data relating to the event according to whether or not the authentication data transmitted to the server is stored in the external storage device and to write the obtained first data into the external storage device.

11. An image forming system according to claim 10, wherein
the prescribed event is malfunction in the image forming apparatus,
the first data is data utilized for analysis of a malfunction upon occurrence of the malfunction in the image forming apparatus and is analysis data obtained from the image forming apparatus,
the first data includes log data of the image forming apparatus, and
the authentication data generating section generates the authentication data based on any one or more of data indicative of date and time when a malfunction occurs in the image forming apparatus, data indicative of a part where a malfunction occurs in the image forming apparatus, and a serial number that the image forming apparatus bears.

12. A method that an image forming apparatus connectable to an external storage device performs, the method comprising:
generating authentication data upon occurrence of a prescribed event and transmitting the generated authentication data to a server via a communication network; and
obtaining, once the external storage device is connected to the image forming apparatus, first data as data relating to the event according to whether or not the authentication data transmitted to the server is stored in the external storage device and writing the obtained first data into the external storage device.

13. A method according to claim 12, wherein
the prescribed event is malfunction in the image forming apparatus,
the first data is data utilized for analysis of a malfunction upon occurrence of the malfunction in the image forming apparatus, and is analysis data obtained from the image forming apparatus,
the first data includes log data of the image forming apparatus, and
the authentication data is generated based on any one or more of data indicative of date and time when a malfunction occurs in the image forming apparatus, data indicative of a part where a malfunction occurs in the image forming apparatus, and a serial number that the image forming apparatus bears.

* * * * *